(12) United States Patent
Stolin (10) Patent No.: US 6,785,428 B1
(45) Date of Patent: Aug. 31, 2004

(54) ROTATED TRANSFORM OF AN IMAGE USING BLOCK TRANSFERS

(75) Inventor: Jacob Y. Stolin, San Jose, CA (US)

(73) Assignee: Adobe Systems Incorporated, San Jose, CA (US)

( * ) Notice: Subject to any disclaimer, the term of this patent is extended or adjusted under 35 U.S.C. 154(b) by 0 days.

(21) Appl. No.: 09/413,014

(22) Filed: Oct. 5, 1999

(51) Int. Cl.[7] ................................................. G06K 9/32
(52) U.S. Cl. ....................... 382/295; 382/289; 345/649
(58) Field of Search ................................. 382/289, 295, 382/296, 293; 345/649, 651, 652, 654

(56) References Cited

U.S. PATENT DOCUMENTS

| 4,637,057 A | 1/1987 | Kermisch | 382/296 |
| 4,829,452 A | 5/1989 | Kang et al. | 345/657 |
| 5,359,706 A | 10/1994 | Sterling | 345/657 |
| 5,986,672 A | * 11/1999 | Groezinger et al. | 345/437 |

FOREIGN PATENT DOCUMENTS

WO    WO 99/19835    4/1999

* cited by examiner

Primary Examiner—Yon J. Couso
(74) Attorney, Agent, or Firm—Fish & Richardson P.C.

(57) ABSTRACT

A method and apparatus for processing a source raster representation of an image, where the source raster representation of the image has an orientation relative to the source raster. The method includes partitioning the source raster into blocks of pixels based on the orientation, and for each block of pixels, calculating a destination location in a destination raster for the block of pixels and transferring the block of pixels to the calculated destination location in the destination raster, the destination location being calculated from the orientation.

26 Claims, 4 Drawing Sheets

ROTATED TRANSFORM OF AN IMAGE USING BLOCK TRANSFERS

BACKGROUND OF THE INVENTION

The present invention relates generally to computing systems and more particularly to methods and apparatus for correcting the orientation of skewed graphical objects.

A conventional scanner or other optical recognition device can be used to produce a graphical representation (a digital version) of an image, text, photograph or picture that can in turn be displayed on a monitor screen. Conventional scanners digitize an image using a scanning device. The scanning device can be of the form of an optical scanner. An optical scanner is an input device that allows a user to take an image or text and render it as a digital image. The image can then be converted in to a graphics file or text file using optical character recognition software. Material scanned can, in turn, be faxed, sent by electronic mail, printed or edited.

Conventional scanners receive data in numerous ways. A flatbed scanner includes a glass scanning surface on which a document can be placed for scanning. A sheetfeed scanner receives hard copies of a document at an input port and includes a feeding mechanism for guiding the document through the device. A handheld scanner requires a user to move a scanning window across a document, where the scanning window is typically only a few inches wide. In each of these type of conventional scanning devices, the graphics produced can be skewed. Skew is defined as the angular or longitudinal deviation of an object from a specified reference. For a scanning device, the reference can be thought of as the original background of the document. After scanning, the objects present on the document may appear skewed from their original orientation on the document. Skewing can result from a slight rotation of the document on the scanning surface, improper feeding by a feed mechanism, or movement at an improper angle when using a handheld scanner.

Conventional computing systems can provide solutions for deskewing a graphical object. One method deskews the graphical object by transferring each pixel in the graphical object to a new position. Other methods use interpolation, including both bicubic and linear interpolation, to transfer pixels to new positions. Each of these methods results in intensive calculations to perform the deskewing process.

SUMMARY OF THE INVENTION

In general, in one aspect, the invention features a method of processing a source raster representation of an image. The source raster representation of the image has an orientation relative to the source raster. The method includes partitioning the source raster into blocks of pixels based on the orientation. For each block of pixels, a destination location in a destination raster is calculated from the orientation. Thereafter, blocks of pixels are transferred to the respective calculated destination locations in the destination raster.

The step of partitioning the source raster into blocks of pixels includes obtaining a height and a width of the source raster measured in pixels, calculating a number of columns from the width of the source raster and the orientation, calculating a number of rows from the height of the source raster and the orientation, and determining the sizes of the blocks of pixels from the width of the source raster, the height of the source raster, the number of rows, and the number of columns.

The step of calculating a destination location for a block of pixels includes calculating a displacement for each block of pixels based on the orientation of the source raster representation relative to the source raster, and adding the displacement to the original location of the respective block of pixels. Each block of pixels is transferred by copying the block of pixels to the destination location in the destination raster with a block transfer operation.

The method further includes finding a gap pixel in the destination raster between two blocks of pixels copied from the source raster, and determining a value for the gap pixel.

Preferred embodiments of the invention can include one or more of the following features. The value for each gap pixel is found by calculating a source pixel location in the source raster corresponding to the gap pixel location, and determining the value for the gap pixel from the value of the corresponding source pixel. The source raster representation of the image is rotated or skewed relative to the source raster.

Aspects of the invention can include one or more of the following advantages. The invention allows for a significant decrease in the number of calculations needed to obtain a slightly rotated raster image. The number of calculations needed to obtain a rotated raster image depends on the angle of rotation. For example, the smaller the angle of rotation, the larger the sizes of the blocks of pixels which result in a smaller number of calculations needed.

Other features and advantages of the invention will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
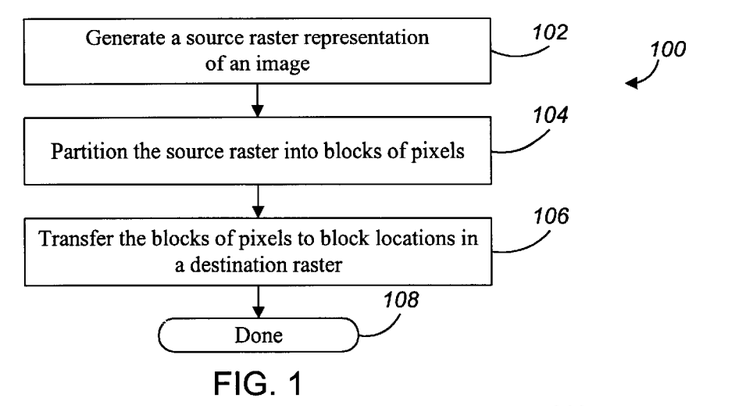
FIG. 1 is a flow diagram for processing a source raster representation of an image.

FIG. 1 shows a process 100 suitable for implementation in a computer program application for processing a graphical object that is skewed by a small angle—for example during a scanning process—with respect to a raster. The input to the process is an image represented in a device-independent user space. The process 100 generates a source raster representation of the image (step 102). The source raster is partitioned into blocks of pixels based on the orientation of the source raster representation of the image relative to the source raster (step 104). For each block of pixels, a destination location is calculated in a destination raster and each block of pixels is transferred to the calculated destination (step 106).

Figure 3A:
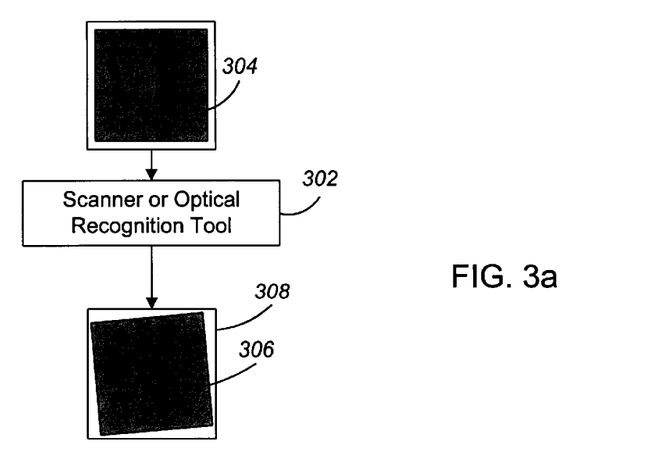
FIG. 3a is a process flow for scanning an image to generate a raster representation of the image.
Figure 3B:
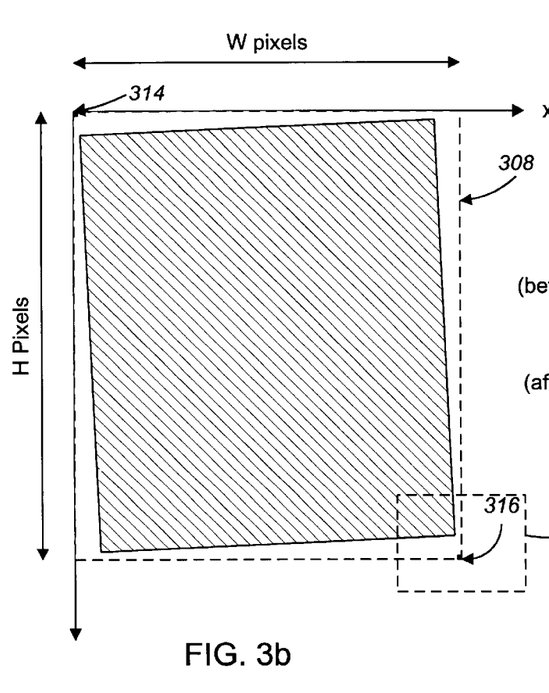
FIG. 3b is an enlargement of the source raster representation of the image in the source raster.

FIG. 3a shows an image 304 as processed by a raster device, such as a scanner. During a scanning process 302, a source raster representation of the image 306 is generated. An enlargement of the source raster representation of the image 306 is shown in FIG. 3b. The process 100 uses conventional methods to determine the orientation of the source raster representation of the image 306 relative to the source raster 308. The source raster representation of the image 306 may be found to be rotated or skewed relative to the source raster. The rotation or skew of the source raster representation of the image 306 relative to the source raster 308, can be expressed as an angle T. The angle T is typically small, between 0 degrees and 2 degrees.

Figure 2A:
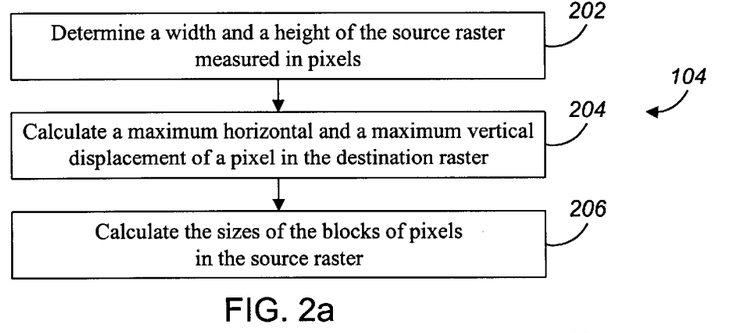
FIG. 2a is a flow diagram for partitioning the source raster into blocks of pixels.

Referring now to FIG. 2a, the step of partitioning the source raster 308 (step 104 of FIG. 1) includes numerous individual steps. A width W and a height H of the source raster 308 are determined (step 202), where the width W and the height H are measured in pixels. The source raster 308 may be represented by a H×W rectangular grid 312. The H×W rectangular grid 312 can be partitioned into blocks (as described in greater detail below) sized such that the horizontal and vertical displacements between any two pixels in a given block change by no more than 1 pixel if each pixel is individually mapped. One conventional method for mapping a pixel in a (x,y) plane to a new position in a (x',y') plane is to "rotate" the pixel through an angle T about an origin. The rotation is defined mathematically by $$x' = x \cos T - y \sin T$$

$$y' = x \sin T + y \cos T$$

The blocks are sized by partitioning the H×W rectangular grid 312 into a number of columns and rows needed to compensate for a maximum horizontal displacement $\text{dispx}_{max}$ 320 and a maximum vertical displacement $\text{dispy}_{max}$ 311 for a pixel in the destination raster 310 as a result of "rotating" the pixel through an angle T about the origin. In one implementation, the origin 314 is at the top-left corner of the H×W rectangular grid 312. In one implementation, the x-axis is oriented along the fast scan direction of the raster device, that is, the direction of the typical linear ordering of sequential raster elements into rasters. The y-axis can be oriented along the slow scan direction of the raster device, that is, the direction of the typical linear ordering of sequential rows of rasters. The pixel in the source raster 308 that will have the maximum horizontal displacement $\text{dispx}_{max}$ 320 and the maximum vertical displacement $\text{dispy}_{max}$ 322 in the destination raster 310 is defined as the pixel $(x_{max}, y_{max})$ 316, where the pixel $(x_{max}, y_{max})$ 316 is the Wth pixel on the Hth scanline in the source raster 308. The values of the maximum horizontal displacement $\text{dispx}_{max}$ 320 and the maximum vertical displacement $\text{dispy}_{max}$ 322 in the destination raster 310 are calculated (step 204) from:

$$x_{max}' = x_{max} + \text{dispx}_{max} = x_{max} \cos T - y_{max} \sin T$$

$$y_{max}' = y_{max} + \text{dispy}_{max} = x_{max} \sin T + y_{max} \cos T$$

Figure 3C:
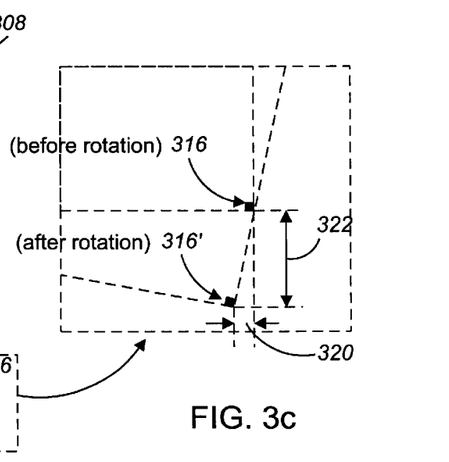
FIG. 3c is an enlargement of FIG. 3b showing the location of a pixel before and after the source raster representation of the image is rotated about an origin.
Figure 3D:
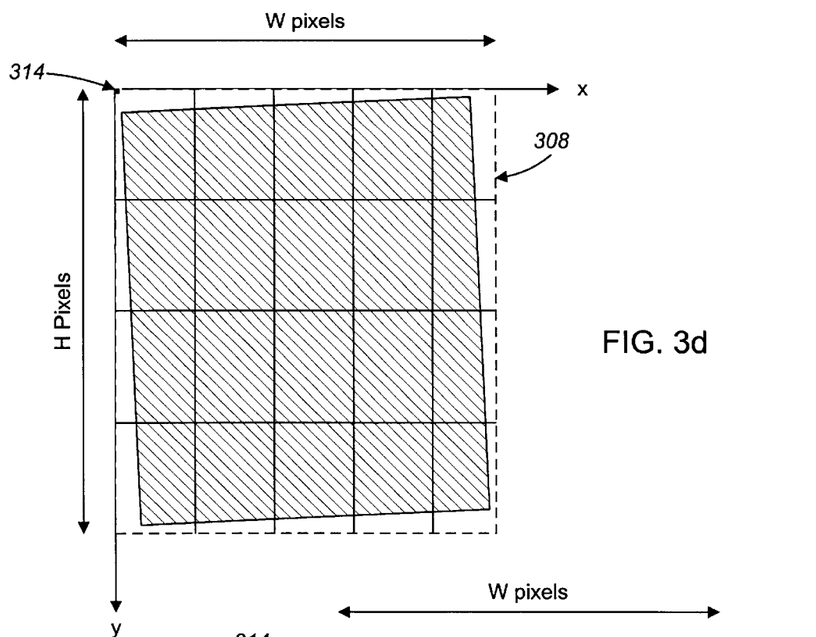
FIG. 3d shows the source raster represented by a rectangular grid, where the rectangular grid is partitioned into blocks of pixels.

For example in FIG. 3c, assuming the pixel $(x_{max}, y_{max})$ 316 has co-ordinates (100,200) in the source raster 308. The co-ordinates of pixel $(x'_{max}, y'_{max})$ 316' in the destination raster 310 are calculated to be (95.9, 203.8). The maximum horizontal displacement $\text{dispx}_{max}$ 320 is 4.1 and the maximum vertical displacement $\text{dispy}_{max}$ 322 is 3.8. In this example, the H×W rectangular grid 312 is partitioned into 5 columns of 4 rows to "absorb" the maximum horizontal and vertical displacement of a pixel in the destination raster 310, respectively, as shown in FIG. 3d. The sizes of the blocks are determined based on the number of rows and columns the H×W rectangular grid 312 is partitioned into (step 206). The blocks of pixels may be non-square shaped. Each block of pixels comprising the H×W rectangular grid 312 can be labeled $\text{block}_{(i,j)}$ according to row number i and column number j.

In one implementation, the orientation of the source raster representation of the image 306 relative to the source raster 308 is such that the values of the width W and the height H are not multiples of the number of columns and rows. In this implementation, the widths of each block of pixels from different columns and heights of each block of pixels from different rows in the H×W rectangular grid 312 may have a 1 pixel difference. This 1 pixel difference is due to a rounding error. For example, if the value of the width W is 82, and the number of columns is 10, then the ideal column size is 82/10=8.2. Since the number of pixels per column has to be an integer value, some of the columns will have 9 pixels per column, while the remainder have 8 pixels per column. In this example, if 2 columns have 9 pixels per column and 8 columns have 8 pixels per column, the difference in the number of pixels per column changes by a maximum of 1 pixel.

Figure 2B:
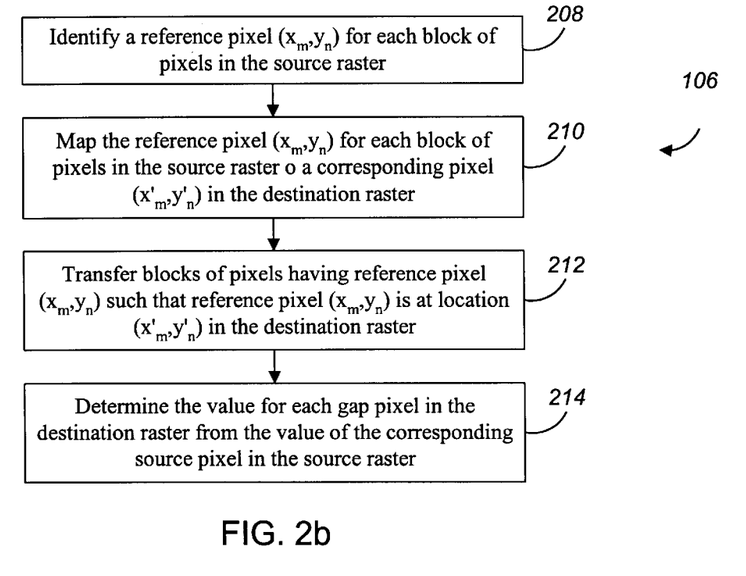
FIG. 2b is a flow diagram for transferring the blocks of pixels.

Referring now to FIG. 2b, the step of transferring the blocks of pixels (step 106 of FIG. 1) includes numerous individual steps. A reference pixel $(x_m, y_n)_{(i,j)}$ of each block of pixels is identified (step 208). The pixel $(x_m, y_n)_{(i,j)}$ is the nth pixel in the mth scanline. In one implementation, the reference pixel $(x_m, y_n)_{(i,j)}$ of each block of pixels is similarly located in each block with respect to the other pixels in the block. For example, the reference pixel $(x_m, y_n)_{(i,j)}$ of each block of pixels may be located in the upper-left corner of the block, in the middle of the top side of the block, or in the center of the blocks for each block. By having similarly located reference pixels, the distance between the reference pixels $(x_m, y_n)_{(i,j)}$ of two adjacent blocks is small enough, such that when shifting occurs the two adjacent blocks will be shifted relative to each other by a distance of no more than 1 pixel. In one implementation, the process 100 identifies the center pixel of each block as the reference pixel.

Figure 4A:
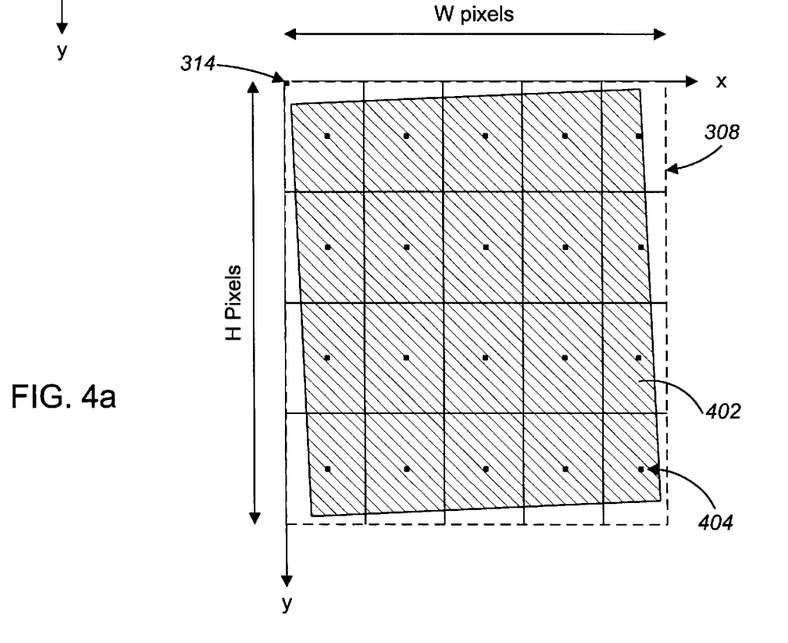
FIG. 4a shows the source raster represented by the rectangular grid, where the rectangular grid is partitioned into blocks of pixels with identified reference pixels.
Figure 4B:
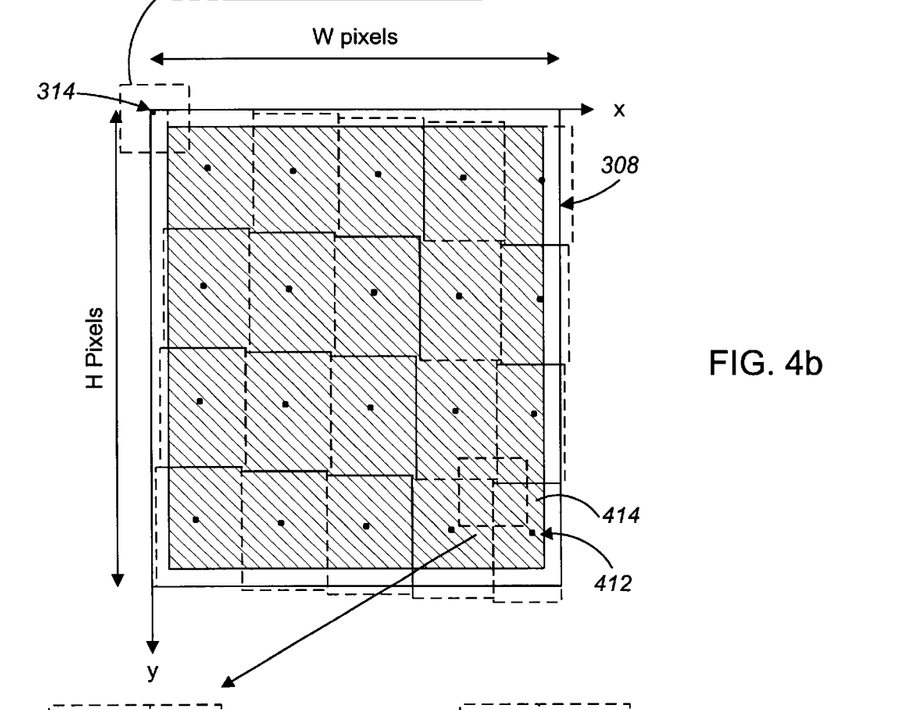
FIG. 4b shows the blocks of pixels in a destination raster positioned to correct the orientation of the source raster representation of the image relative to the source raster shown in FIG. 3b.
Figure 4C:
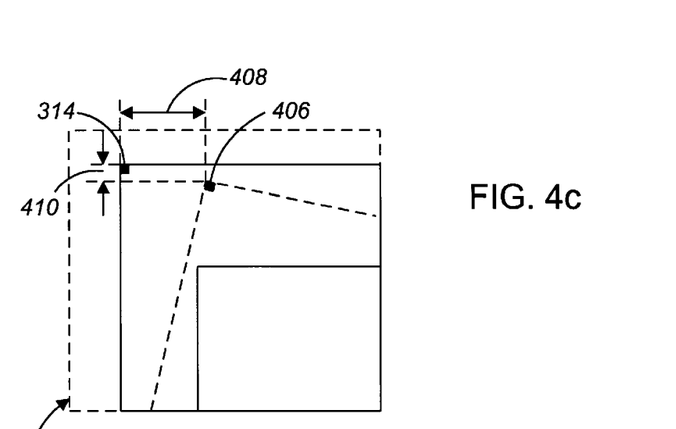
FIG. 4c is an enlargement of FIG. 4b showing the locations of a coordinate origin and a new rotation center.

As shown in FIGS. 4b and 4c, the process 100 "rotates" the reference pixel $(x_m, y_n)_{(i,j)}$ (here the center pixel 404) of each block 402 about a new rotation center (ShiftX, ShiftY) 406 to coordinates $(x'_m, y'_n)_{(i,j)}$ 412 (step 210). Thereafter, the process transfers the blocks of pixels to new block locations in the destination raster 310 (step 212). The rotation of the reference pixel about the new rotation center (ShiftX, ShiftY) rather than the coordinate origin (0,0) is performed to ensure that none of the information in the H×W rectangular grid 312 is lost when the process 100 transfers the blocks of pixels to new block locations in the destination raster 310. The process for transferring blocks of pixels is performed in accordance with the formula:

$$x_m' = x_m \cos T - y_n \sin T + \text{ShiftX}$$

$$y_m' = x_m \sin T - y_n \cos T + \text{ShiftY}$$

where the values of ShiftX 408 and ShiftY 410 are calculated from:

$$ShiftX = \begin{cases} H \times \sin T, & \text{if } T > 0 \\ W \times (1 - \cos T), & \text{if } T < 0 \end{cases}$$

$$ShiftY = \begin{cases} H \times (1 - \cos T), & \text{if } T > 0 \\ -W \times \sin T, & \text{if } T < 0 \end{cases}$$

For example in FIG. 4a, $block_{(4,5)}$ 402 includes a reference pixel at coordinates $(x_m, y_n)_{(4,5)}$ 404. In FIG. 4b, the co-ordinate $(x'_m, y'_n)_{(4,5)}$ 412 is the destination location. The destination location defines the pixel location in the destination raster 310 to which the reference pixel $(x_m, y_n)_{(4,5)}$ 404 of $bloc_{(4,5)}$ 402 in the H×W rectangular grid 312 is to move. Once the destination location of the reference pixel at coordinates $(x_m, y_n)_{(4,5)}$ 404 is determined, the process 100 transfers the pixels of $block_{(4,5)}$ 402 to a block location 414 such that the reference pixel of $block_{(4,5)}$ 402 is at co-ordinates $(x'_m, y'_n)_{(4,5)}$ 412. The blocks of pixels can be transferred in hardware or software. In one implementation, a hardware bit blip engine can be included to perform the operation.

The process 100 repeats the operation of identifying a reference pixel $(x_m, y_n)_{(i,j)}$ for each block of pixels, mapping the reference pixel $(x_m, y_n)_{(i,j)}$ to a corresponding pixel $(x'_m, y'_n)_{(i,j)}$ in the destination raster 310, and moving the block of pixels to a block location until every block in the H×W rectangular grid 312 has been processed. FIG. 4b shows the resultant destination image formed once all the blocks of pixels in the H×W rectangular grid 312 are transferred to block locations in the destination raster 310. When all blocks have been transferred, the orientation of the source raster representation of the image relative to the source raster is corrected.

Figure 4D:
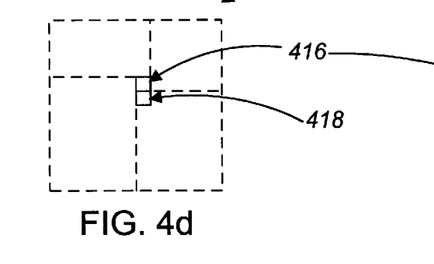
FIG. 4d is an enlargement of FIG. 4b showing a gap pixel in the destination raster.
Figure 4E:
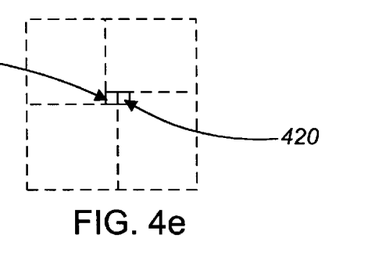
FIG. 4e shows a gap pixel in the destination raster.

Rotation gaps may appear as a result of the block transfer operations. In one implementation when T>0, a gap pixel $(x_p', y_p')_{(i,j)}$ 416 is located above the top-left pixel $(x_{tl}', y_{tl}')_{(i,j)}$ 418 of each block of pixels in the destination raster 310 copied from the H×W rectangular grid, as shown in FIG. 4d. In another implementation when T<0, a gap pixel $(x_p', y_p')_{(i,j)}$ 416 is located to the left of the top-left pixel $(x_{tl}', y_{tl}')_{(i,j)}$ 420 of each block of pixels in the destination raster 310 copied from the H×W rectangular grid, as shown in FIG. 4e. The process 100 locates a gap pixel $(x_p', y_p')_{(i,j)}$ in the destination raster 310 in accordance with the formula:

$$(x_p', y_p')_{(i,j)} = (x_{tl}, y_{tl}-1)_{(i,j)} \text{ if } T>0$$

$$(x_p', y_p')_{(i,j)} = (x_{tl}-1, y_{tl})_{(i,j)} \text{ if } T<0$$

The process 100 then calculates the source pixel location in the source raster 308 corresponding to each gap pixel location in the destination raster 310 in accordance with the formula:

$$x_p = x_p' \cos T + y_p' \sin T + ShiftX \cos T - ShiftY \sin T$$

$$x_p = -x_p' \sin T + y_p' \sin T + ShiftX \sin T - ShiftY \cos T$$

Once the source pixel location is found, the process 100 determines a value for the gap pixel $(x_p', y_p')_{(i,j)}$ from the value of the corresponding source pixel $(x_p, y_p)_{(i,j)}$ (step 214). By accounting for each gap pixel $(x_p', y_p')_{(i,j)}$ in the destination raster 310, rotation gaps as a result of block transfers of pixels can be eliminated.

The invention can be implemented in digital electronic circuitry, or in computer hardware, firmware, software, or in combinations of each. Apparatus of the invention can be implemented in a computer program product tangibly embodied in a machine-readable storage device for execution by a programmable processor; and method steps of the invention can be performed by a programmable processor executing a program of instructions to perform functions of the invention by operating on input data and generating output. The invention can be implemented advantageously in one or more computer programs that are executable on a programmable system including at least one programmable processor coupled to receive data and instructions from, and to transmit data and instructions to, a data storage system, at least one input device, and at least one output device. Each computer program can be implemented in a high-level procedural or object-oriented programming language, or in assembly or machine language if desired; and in any case, the language can be a compiled or interpreted language. Suitable processors include, by way of example, both general and special purpose microprocessors. Generally, a processor will receive instructions and data from a read-only memory and/or a random access memory. Generally, a computer will include one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM disks. Any of the foregoing can be supplemented by, or incorporated in, ASICs (application-specific integrated circuits).

To provide for interaction with a user, the invention can be implemented on a computer system having a display device such as a monitor or LCD screen for displaying information to the user and a keyboard and a pointing device such as a mouse or a trackball by which the user can provide input to the computer system. The computer system can be programmed to provide a graphical user interface through which computer programs interact with users.

The invention has been described in terms of particular implementations. Other implementations are within the scope of the following claims. For example, the steps of the invention can be performed in a different order and still achieve desirable results.

What is claimed is:

1. A method of processing a source raster representation of an image, comprising:
   determining a maximum displacement for a pixel having a maximum displacement when moving from a source raster to a destination raster;
   determining a block width based on the maximum displacement that minimizes a number of calculations required to process a source raster representation;
   determining a block height based on the maximum displacement that minimizes a number of calculations required to process the source raster representation, the block height being different from the block width;
   partitioning the source raster into blocks of pixels based on the block width and the block height, each block having substantially an equal size; and
   for each block of pixels, calculating a destination location in a destination raster for the block of pixels and transferring the block of pixels to the calculated destination location in the destination raster.

2. The method of claim 1, wherein determining the block size comprises:
   obtaining a height and a width of the source raster measured in pixels calculating a number of columns required to span the width of the source raster;

calculating a number of rows required to span the height of the source raster; and determining a block size from the width of the source raster, the height of the source raster, the number of rows, and the number of columns.

3. The method of claim 1, wherein calculating a destination location for a block of pixels comprises:

calculating a displacement for each block of pixels based on an orientation of the source raster representation relative to the source raster; and adding the displacement to an original location associated with a respective block of pixels.

4. The method of claim 1, wherein transferring the block of pixels comprises:

copying the block of pixels to the destination location in the destination raster.

5. The method of claim 1, wherein the destination raster has a gap pixel between two blocks of pixels copied from the source raster, and an orientation of the source raster representation of the image relative to the source raster is measured by an angle of rotation, the method further comprising:

if the angle of rotation is greater than zero, determining a position of the gap pixel in the destination raster, the gap pixel being located above a top-left pixel of each block of pixels copied from the source raster;

if the angle of rotation is less than zero, determining the position of the gap pixel in the destination raster, the gap pixel being located left of the top-left pixel of each block of pixels copied from the source raster; and determining a value for the gap pixel.

6. A method of processing a source raster representation of an image, comprising:

determining a maximum displacement for a pixel having a maximum displacement when moving from a source raster to a destination raster;

determining a block size based on the maximum displacement that minimizes a number of calculations required to process a source raster representation;

partitioning the source raster into blocks of pixels based on the block size, each block having substantially an equal size;

for each block of pixels, calculating a destination location in a destination raster for the block of pixels and transferring the block of pixels to the calculated destination location in the destination raster;

finding a gap pixel in the destination raster between two blocks of pixels copied from the source raster;

calculating a source pixel location in the source raster corresponding to the gap pixel location; and determining a value for the gap pixel from a value of a corresponding source pixel.

7. The method of claim 1, wherein the source raster representation of the image is rotated relative to the source raster.

8. The method of claim 1, wherein the source raster representation of the image is skewed relative to the source raster.

9. A method of processing a source raster representation of an image, the method comprising:

determining a maximum displacement for a pixel having a maximum displacement when moving from a source raster to a destination raster;

identifying a subset of the pixels of a source raster representation;

associating with each pixel in the subset of pixels one or more other pixels based on the maximum displacement, the subset of pixels not forming a square block, each pixel in the subset of pixels having substantially an equal number of associated pixels, such that a minimum number of calculations is required to process the source raster representation;

calculating a destination location in a destination raster for each pixel in the subset of pixels; and transferring each pixel in the subset of pixels and each other associated pixel to relative locations in the destination raster based on the calculated destination location.

10. A computer program product, tangibly stored on a computer-readable medium, for processing a source raster representation of an image, the product comprising instructions operable to cause a programmable processor to:

determine a maximum displacement for a pixel having a maximum displacement when moving from a source raster to a destination raster;

determine a block width based on the maximum displacement that minimizes a number of calculations required to process a source raster representation;

determine a block height based on the maximum displacement that minimizes a number of calculations required to process the source raster representation, the block height being different from the block width;

partition the source raster into blocks of pixels based on the block width and the block height, each block having substantially an equal size; and for each block of pixels, calculate a destination location in a destination raster for the block of pixels and transfer the block of pixels to the calculated destination location in the destination raster.

11. A computer program product, tangibly stored on a computer-readable medium, for processing a source raster representation of an image, the product comprising instructions operable to cause a programmable processor to:

determine a maximum displacement for a pixel having a maximum displacement when moving from a source raster to a destination raster;

identify a subset of pixels of a source raster representation;

associate with each pixel in the subset of pixels one or more other pixels based on the maximum displacement, the subset of pixels not forming a square block, each pixel in the subset of pixels having substantially an equal number of associated pixels, such that a minimum number of calculations is required to process the source raster representation;

calculate a destination location in a destination raster for each pixel in the subset of pixels; and transfer each pixel in the subset of pixels and each other associated pixel to relative locations in the destination raster based on the calculated destination location.

12. The method of claim 1, wherein the maximum displacement has a maximum horizontal displacement and a maximum vertical displacement, the block size has a block width and a block height, and determining the block size includes:

determining the block width based on the maximum vertical displacement; and determining the block height based on the maximum horizontal displacement.

13. A method of processing a source raster representation of an image, the method comprising:

determining a displacement for a pixel having a maximum displacement when moving from a source raster to a destination raster;

determining a block size based on the displacement, the block size having a block width and a block height, the block height being different from the block width;

partitioning the source raster into blocks of pixels based on the block size, each block of the blocks of pixels having substantially an equal size; and for each block of pixels, calculating a destination location in the destination raster for the block of pixels and transferring the block of pixels to the calculated destination location in the destination raster.

14. The method of claim 13, wherein determining the block size comprises:

obtaining a height and width of the source raster measured in pixels;

calculating a number of columns required to span the width of the source raster based on the displacement;

calculating a number of rows required to span the height of the source raster based on the displacement; and determining the block size from the width of the source raster, the height of the source raster, the number of rows, and the number of columns.

15. The method of claim 13, wherein the source raster representation of the image is rotated relative to the source raster.

16. The method of claim 13, wherein the source raster representation of the image is skewed relative to the source raster.

17. The method of claim 2, wherein an integer multiple of blocks does not cover a width of the source raster and determining the block size comprises:

increasing the block width for one or more blocks so that a number of columns spans a width of the source raster.

18. The method of claim 2, wherein an integer multiple of blocks does not cover a height of the source raster and determining the block size comprises:

increasing the block height for one or more blocks so that a number of rows spans a height of the source raster.

19. The method of claim 4, wherein:

copying the block of pixels includes block transferring the block of pixels.

20. The method of claim 13, wherein an integer multiple of blocks does not cover a width of the source raster and determining the block size comprises:

increasing the block width for one or more blocks so that a number of columns spans a width of the source raster.

21. The method of claim 13, wherein an integer multiple of blocks does not cover a height of the source raster and determining the block size comprises:

increasing the block height for one or more blocks so that a number of rows spans a height of the source raster.

22. A computer program product, tangibly stored on a computer-readable medium, for processing a source raster representation of an image, the product comprising instructions operable to cause a programmable processor to:

determine a maximum displacement for a pixel having a maximum displacement when moving from a source raster to a destination raster;

determine a block size based on the maximum displacement that minimizes a number of calculations required to process a source raster representation;

partition the source raster into blocks of pixels based on the block size, each block having substantially an equal size;

for each block of pixels, calculate a destination location in a destination raster for the block of pixels and transferring the block of pixels to the calculated destination location in the destination raster;

find a gap pixel in the destination raster between two blocks of pixels copied from the source raster;

calculate a source pixel location in the source raster corresponding to the gap pixel location; and determine a value for the gap pixel from a value of a corresponding source pixel.

23. The method of claim 6, wherein determining the block size comprises:

obtaining a height and a width of the source raster measured in pixels calculating a number of columns required to span the width of the source raster;

calculating a number of rows required to span the height of the source raster; and determining a block size from the width of the source raster, the height of the source raster, the number of rows, and the number of columns.

24. The method of claim 6, wherein calculating a destination location for a block of pixels comprises:

calculating a displacement for each block of pixels based on an orientation of the source raster representation relative to the source raster; and adding the displacement to an original location associated with a respective block of pixels.

25. The computer program product of claim 22, wherein the instructions for determining the block size cause the programmable processor to:

obtain a height and a width of the source raster measured in pixels calculate a number of columns required to span the width of the source raster;

calculate a number of rows required to span the height of the source raster; and determine a block size from the width of the source raster, the height of the source raster, the number of rows, and the number of columns.

26. The computer program product of claim 22, wherein the instructions for calculating a destination location for-a block of pixels cause the programmable processor to:

calculate a displacement for each block of pixels based on an orientation of the source raster representation relative to the source raster; and add the displacement to an original location associated with a respective block of pixels.

* * * * *

UNITED STATES PATENT AND TRADEMARK OFFICE
CERTIFICATE OF CORRECTION

PATENT NO.    : 6,785,428 B1
DATED         : August 31, 2004
INVENTOR(S)   : Jacob Y. Stolin It is certified that error appears in the above-identified patent and that said Letters Patent is hereby corrected as shown below:

Column 10,
Lines 23 and 42, after "pixels", insert -- ; --;
Line 51, delete "-" between "for" and "a".

Signed and Sealed this

Fifteenth Day of March, 2005

JON W. DUDAS
*Director of the United States Patent and Trademark Office*